United States Patent

[11] 3,627,860

[72] Inventor Werner Hagen
 Unterpfaffenhofen near Munich, Germany
[21] Appl. No. 754,078
[22] Filed Aug. 20, 1968
[45] Patented Dec. 14, 1971
[73] Assignee Metzeller AG
 Munich, Germany
[32] Priority Aug. 21, 1967
[33] Germany
[31] P 17 04 846.3

[54] METHOD OF FORMING RECTANGULAR CROSS-SECTION FOAM POLYURETHANE BY DIRECTING UPWARD CURRENTS OF AIR ALONG THE SIDES OF THE FORMING TROUGH
8 Claims, 5 Drawing Figs.

[52] U.S. Cl. .................................................. 264/51,
 18/4 B, 18/5 A, 18/5 P, 264/54, 264/88
[51] Int. Cl. ...................................................... B29d 27/04
[50] Field of Search ............................................ 264/54, 88,
 51; 18/4 B, 5 A, 5 F

[56] References Cited
UNITED STATES PATENTS

| 3,152,361 | 10/1964 | Edwards | 264/54 X |
| 3,193,406 | 7/1965 | Mittelman | 264/88 X |
| 3,197,531 | 7/1965 | Wilbur | 264/88 |

*Primary Examiner*—Donald J. Arnold
*Assistant Examiner*—Paul A. Leipold
*Attorney*—Michael S. Striker ABSTRACT: A continuous slab of rectangular cross-sectional outline is formed by feeding free-rising polyurethane foam into a trough formed by travelling bottom and lateral liners of release paper so that such foam forms a continuous loaf which travels lengthwise through a foaming zone wherein it rises to form the slab. Friction between lateral liners and the sides of the loaf is reduced by currents of gas which are blown upwardly along the edges of the bottom liner.

Inventor:
Werner Hagen
by Richard J. Striker
his Attorney

METHOD OF FORMING RECTANGULAR CROSS-SECTION FOAM POLYURETHANE BY DIRECTING UPWARD CURRENTS OF AIR ALONG THE SIDES OF THE FORMING TROUGH

CROSS-REFERENCE TO RELATED APPLICATION

The present method and apparatus constitute improvements over and further developments of methods and apparatus disclosed in the copending allowed application Ser. No. 745,267 filed July 16, 1968 by Darmochwal et al. for "Method and Apparatus For The Production of Foamed Slabs Of Rectangular Cross-Section" and assigned to the same assignee.

BACKGROUND OF THE INVENTION

The present invention relates to a method and apparatus for the production of foam material. More particularly, the invention relates to a method and apparatus for the production of slabs consisting of flexible urethane stock or analogous synthetic plastic material. Still more particularly, the invention relates to continuous production of slabs which are obtained on foaming of free-rising foam which travels lengthwise within the confines of a liner of release paper or the like and which is controlled while it rises to form a slab of substantially or exactly rectangular cross-sectional outline.

Slabs with a substantially rectangular cross-sectional outline are presently produced in a stationary mold which accommodates a travelling flexible liner of release paper serving to advance free-rising foam through a foaming zone wherein the material rises to form a slab. Such traveling liner coats the bottom wall of the trough. Two lateral liners are provided along the inner sides of the sidewalls of the trough and are caused to perform a composite movement having a horizontal component in the direction of travel of the loaf-supporting liner and an upwardly oriented vertical component. Such composite movements of lateral liners are intended to insure that the sides of the loaf rise at the same rate as the central portion thereof so that the resulting slab does not exhibit a pronounced ridge or crest. The lower edge portions of the lateral liners are caused to overlie a substantially runnerlike guide plate which extends from the point where the loaf begins to foam. The speed of horizontal movement of lateral liners equals the forward speed of the bottom liner and their speed in the direction upwardly and away from the bottom liner is such that it at least equals or even exceeds the speed at which the loaf rises during travel through the foaming zone. This is intended to reduce friction between the loaf and the lateral liners and to thus insure free rise of the loaf and the formation of a flat-top slab. Reference may be had to German Pat. No. 1,207,072.

A drawback of the just outlined procedure is that the speed of travel of lateral liners must be controlled with a high-degree of precision and that the foaming zone must be supervised at all times in order to insure that the vertical component of movement of each lateral liner corresponds to the speed at which the loaf rises. The problem is the same in certain other types of conventional apparatus wherein the lateral liners are replaced by rotating disks which flank the foaming zone. The speed of such disks must be controlled with a high degree of precision which involves the use of skilled labor and complicated adjusting and detecting mechanisms.

SUMMARY OF THE INVENTION

It is an object of the present invention to provide a novel and improved method of producing flat-top slabs of foamed material.

Another object of the invention is to provide a method according to which a loaf of free-rising foam can be converted into a slab of rectangular cross-sectional outline without necessitating constant supervision of the foaming zone and/or transport of release paper in several directions.

A further object of the invention is to provide a novel method of reducing friction between a travelling loaf of rising foam and liners of release paper.

An additional object of this invention is to provide an apparatus which can be employed in the practice of the above-outlined method.

An ancillary object of the invention is to provide the apparatus with novel means for reducing or eliminating friction between a travelling loaf of free-rising foam and lateral liners of release paper.

The improved method comprises the steps of feeding free-rising foam into an elongated path to form a continuous loaf which is confined from below and at two sides thereof, advancing the load lengthwise through a foaming zone wherein the loaf rises to form a slab, and establishing upwardly flowing current of air or another suitable gas at both sides of the loaf in the foaming zone.

The path for the loaf is preferably horizontal or nearly horizontal. The speed of the upwardly flowing current at one side of the loaf is preferably the same as the speed of the other current. Both currents preferably flow vertically upwardly.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 5:
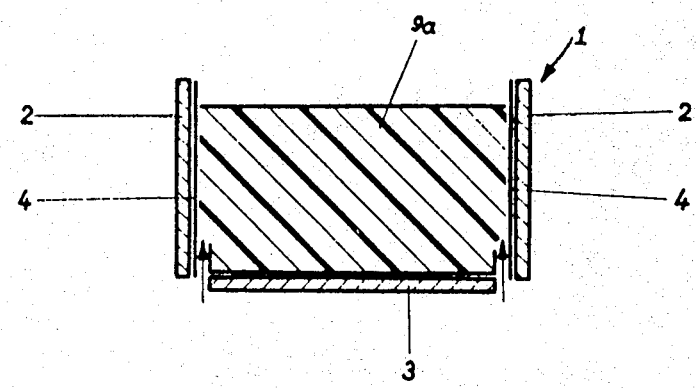
FIG. 5 is a section on the line V—V of FIG. 1.
Figure 1:
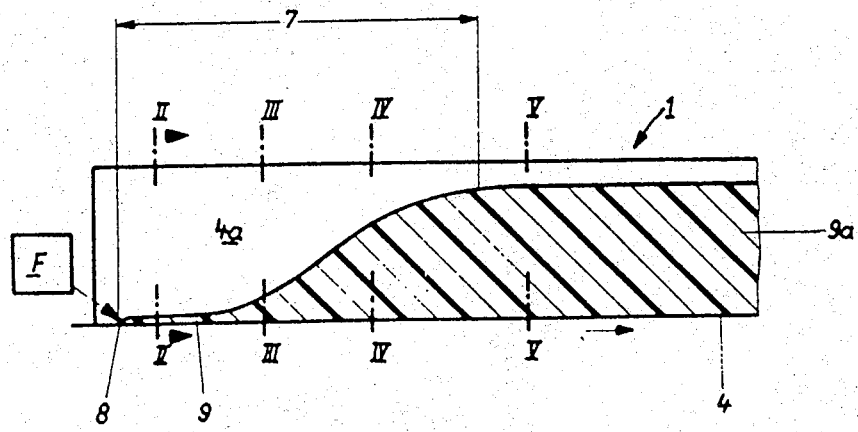
FIG. 1 is a fragmentary schematic longitudinal vertical sectional view of an apparatus which embodies the invention.
Figure 2:
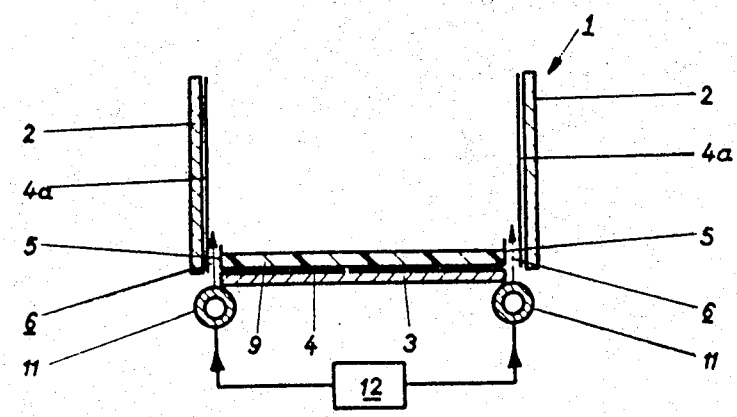
FIG. 2 is a transverse vertical sectional view as seen in the direction of arrows from the line II—II of FIG. 1.

FIGS. 1 and 2 illustrate an elongated conveyor 1 having a travelling bottom portion including a bottom wall 3 and a bottom liner 4 of release paper or the like which overlies the bottom wall. The conveyor further comprises two stationary sidewalls 2 which extend upwardly from the bottom wall 3 and are separated therefrom by narrow clearances or gaps 6. Those sides of the sidewalls 2 which face each other are coated with lateral liners 4a of release paper or the like. As shown in FIG. 2, the marginal portions 5 of the bottom liner 4 are turned upwardly so that this bottom liner forms a shallow trough which receives a continuous supply of free-rising foam from a feed F shown in FIG. 1. This feed may include a source of free-rising foam and a customary traversing head which moves transversely of the bottom wall 3 and discharges foam which forms a continuous loaf 9. Such loaf is then advanced with the bottom liner 4 through an elongated foaming zone 7 where it rises to form a slab 9a (FIGS. 1 and 5). The point or area where the traversing head of the feed F admits free-rising foam is indicated at 8.

The gaps extend along the full length of the foaming zone 7 and serve to admit ascending currents of air or other gas. The means for establishing such currents of gas includes a pair of elongated pipes 11 having orifices which discharge gas into the respective gaps. The pipes 11 are connected to a source 12 of compressed gas, for example, to an air compressor or a pressure tank.

Figure 4:
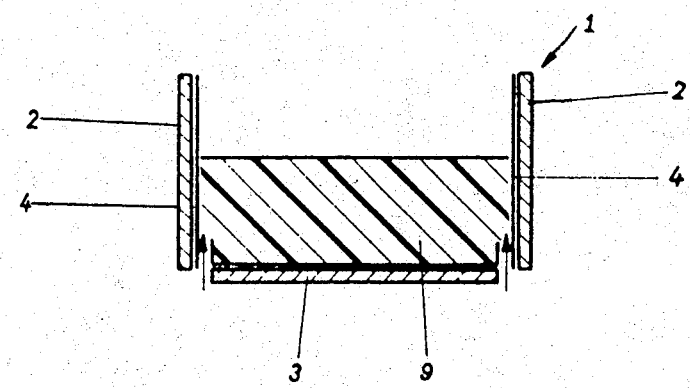
FIG. 4 is a section on the line IV—IV of FIG. 1.
Figure 3:
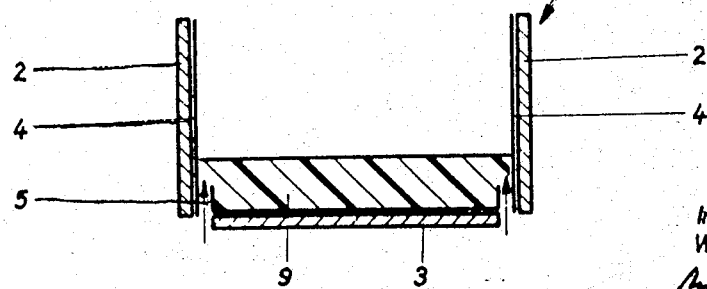
FIG. 3 is a section on the line III—III of FIG. 1.

The operation is as follows:

The feed F admits free-rising foam at 8 whereby such foam spreads on the bottom liner 4 between the marginal portions 5 and forms a continuous loaf 9 which advances lengthwise through the foaming zone 7. The intermediate stages in rise of the loaf 9 are shown in FIGS. 3 and 4. At the downstream end of the foaming zone 7, the loaf 9 is fully converted into a slab 9a (FIG. 5) which is a flat-top slab, i.e., it does not exhibit a crest or ridge which normally extends along the center of the top surface of a conventional slab. The pipes 11 admit compressed gas while successive increments of the loaf 9 advance through the foaming zone 7 whereby the resulting currents of gas eliminate or reduce friction between the sides of the loaf and the lateral liners 4a so that the sides of the loaf can rise at the same rate as its central zone.

If desired, the lateral liners 4a can form with the bottom liner 4 an integral liner which resembles a trough having rows of perforations extending along the sides of the bottom wall 3. Such perforations may resemble the perforations of roll film and serve to admit currents of gas issuing from the orifices of the pipes 11. The perforations may be formed in the lower marginal portions of lateral liners 4a and/or in the marginal portions 5 of the bottom lines 4.

An important advantage of my improved method and apparatus is that it is not necessary to continuously inspect the foaming zone 7, i.e., to monitor the rate at which the loaf 9 rises in the region between the feed F and the downstream end of the foaming zone. All that is necessary is to properly select the speed at which the currents of air flow upwardly along the inner sides of the lateral liners 4a and to thereupon maintain such speed until and unless the composition of free-rising material issuing from the feed F is changed. The appropriate speed of gas flow can be readily determined by simple experimentation. The liners 4a preferably travel with the liner 4 even though it is also possible to employ stationary lateral liners. The speed of both gas currents is preferably the same and each of the pipes 11 preferably discharges a line or row of vertical jets of gas.

What is claimed as new and desired to be protected by Letters Patent is set forth in the appended claims:

1. A method of producing foamed slabs of substantially rectangular cross-sectional outline, comprising the steps of providing an upwardly open elongated trough defined by a longitudinally travelling bottom portion and sidewalls extending upwardly from said bottom portion at opposite lateral sides of but out of contact with the same; feeding free-rising synthetic plastic polyurethane foam into said trough so as to form in the latter a continuous loaf which is confined from below and at opposite lateral sides; advancing the loaf longitudinally of said trough on said travelling bottom portion while the loaf rises to from a slab; and directing currents of gas in upward flow between the respective lateral sides of the rising loaf and the respective sidewalls to thereby reduce friction between them.

2. A method as defined in claim 1, and further comprising the step of interposing a flexible liner between said bottom portion and said loaf.

3. A method as defined in claim 1, an comprising the step of maintaining said sidewalls stationary with reference to said loaf and said bottom portion.

4. A method as defined in claim 1, and further comprising the step of interposing flexible liners between said loaf and the respective sidewalls outwardly of said currents.

5. A method as defined in claim 1, wherein said gas is air.

6. A method as defined in claim 1, wherein said trough is substantially horizontal.

7. A method as defined in claim 1, where the speed of the currents at both sides of the loaf is the same.

8. A method as defined in claim 1, wherein the directions of gas flow at both sides of the loaf are vertical.

* * * * *